(No Model.)

G. G. HOWE.
FRICTION CLUTCH.

No. 453,810. Patented June 9, 1891.

Witnesses:
C. M. Hood.
F. L. McGahan.

Inventor
Glenn G. Howe
By His Attorney
H. P. Hood.

UNITED STATES PATENT OFFICE.

GLENN G. HOWE, OF INDIANAPOLIS, INDIANA.

FRICTION-CLUTCH.

SPECIFICATION forming part of Letters Patent No. 453,810, dated June 9, 1891.

Application filed March 9, 1891. Serial No. 384,273. (No model.)

*To all whom it may concern:*

Be it known that I, GLENN G. HOWE, a citizen of the United States, residing at Indianapolis, in the county of Marion and State of Indiana, have invented a new and useful Improvement in Friction-Clutches, of which the following is a specification.

My invention relates to an improved friction-clutch for connecting a shaft with a pulley mounted loosely thereon.

The object of my improvement is to provide means whereby friction-blocks mounted on the shaft so as to revolve at all times therewith may be held normally with a slight force in contact with the inside of the rim of a loose pulley mounted on said shaft in such a manner that the pulley rotating in one direction will operate to draw the blocks into closer contact therewith, and thus rotate the shaft, while the rotation of the pulley in the opposite direction will operate to relieve the pressure on the blocks and leave the shaft at rest, the same result being accomplished at the will of the operator when the pulley is turning in the first direction by means of a sliding collar on the shaft, all as hereinafter fully described.

The accompanying drawings illustrate my invention.

Figure 3:
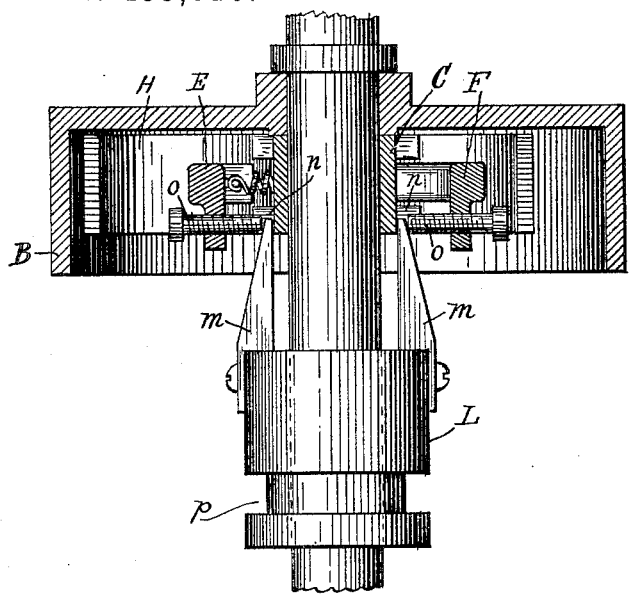
Figure 1:
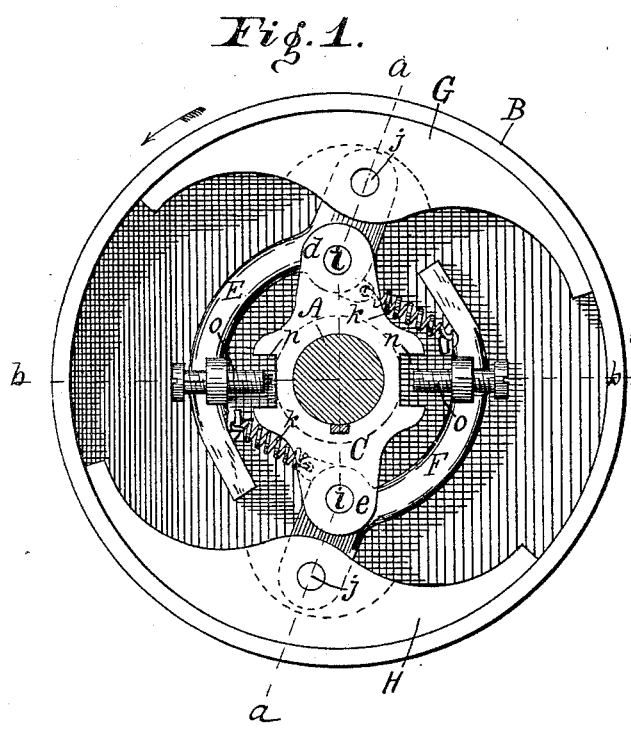
Figure 2:
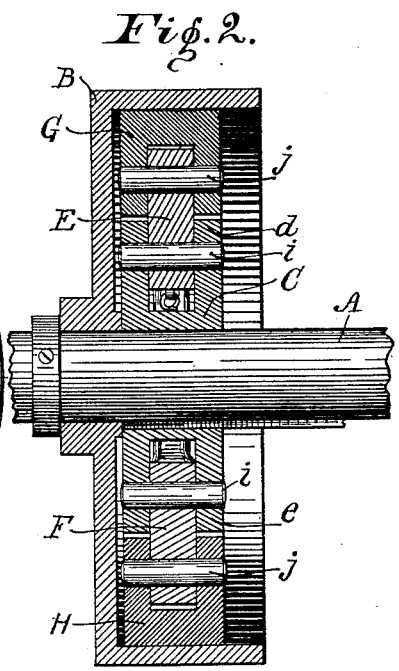

Figure 1 represents a side elevation; Fig. 2, a section on line $a\,a$, Fig. 1; and Fig. 3, a section on line $b\,b$, Fig. 1, and a plan of the sliding collar for disengaging the clutch.

A represents a shaft, which is mounted so as to revolve in suitable bearings. (Not shown.)

B is a band-pulley, whose rim has a smooth interior surface, and which is mounted so as to turn on the shaft.

C is a hub rigidly secured to the shaft and having on opposite sides a pair of radially-projecting forked arms $d$ and $e$, to which a pair of bent levers E and F are pivoted at $i\,i$. Pivoted to the outer ends of the shorter arms of levers E and F at $j\,j$ are a pair of friction-blocks G H, whose outer surfaces are curved to fit the interior surfaces of the rim of the pulley. The relation of the shaft and pivots $i$ and $j$ is such that pivots $j$ are on opposite sides of a line drawn through the centers of the shaft and pivots $i$, so that as pivots $j$ move toward said line the friction-blocks G and H are forced outward against the rim of the pulley. Blocks G and H are held normally in contact with the pulley-rim with a slight pressure by means of spiral springs $k\,k$, which are attached at opposite ends, respectively, to the levers E and F in such a manner as to draw said levers together.

For the purpose of forcing the longer arms of levers E and F apart, and thus withdrawing the friction-blocks from the pulley-rim, I mount on the shaft opposite the hub C a collar L, adapted to turn with the shaft and to slide longitudinally thereon. Secured to said collar and projecting longitudinally therefrom are a pair of wedges $m\,m$, which rest and slide in grooves $n\,n$, formed in opposite sides of the hub C. Each of the levers is provided with a set-screw $o$, which projects laterally from the arm into the path of one of the wedges $m$.

The operation of my device is as follows: The friction-blocks G and H, being normally held in contact with the inner surface of the pulley-rim by the springs $k\,k$ and levers E and F when the pulley is rotated in the direction indicated by the arrow, the shaft being at rest and the collar L being in the position indicated in Fig. 3, the friction-blocks are drawn slightly forward and the short arms of levers E and F forming, with the hub C and the blocks, a pair of toggle-joints, the blocks are pressed strongly against the pulley-rim with a force proportionate to the amount of resistance to the movement of the shaft, and the shaft is thus rotated with the pulley. In case the pulley is turned in the opposite direction the pressure on the friction-blocks is at once relieved and the shaft does not turn. When it is desired to disengage the friction-blocks from the pulley-rim, collar L is pushed toward the hub C by means of a forked lever engaging the groove $p$ in the collar in the usual well-known manner, thus forcing outward by means of the wedges $m\,m$ the set-screws $o\,o$ and the arms in which they are mounted and drawing the friction-blocks inward until they are clear of the rim.

I claim as my invention—

1. In a friction-clutch, the combination of the shaft, the pulley mounted loosely on the shaft, the hub rigidly secured to the shaft, the levers pivoted to the hub, the friction-blocks pivoted to the levers, and the springs arranged to connect the levers and to thereby hold the friction-blocks normally outward against the rim of the pulley, all arranged to co-operate substantially as and for the purpose set forth.

2. In a friction-clutch, the combination of the following elements, namely: a shaft, a pulley mounted loosely on the shaft, a hub rigidly secured to the shaft within the rim of the pulley, a lever pivoted to the hub, a friction-block pivoted to one end of said lever and arranged to engage the inner surface of the rim, a spring attached to the opposite end of the lever and arranged to force the block outward, and a collar carrying a wedge and arranged to slide longitudinally on the shaft and to engage the lever, and to thereby draw the block inward, all arranged to co-operate substantially as and for the purpose set forth.

GLENN G. HOWE.

Witnesses:
H. P. HOOD,
E. M. HOOD.